United States Patent [19]

Anezaki et al.

[11] Patent Number: 5,649,227
[45] Date of Patent: Jul. 15, 1997

[54] SYSTEM FOR SUPPORTING A CONVERSION BETWEEN ABSTRACT SYNTAX AND TRANSFER SYNTAX

[75] Inventors: Akihiro Anezaki, Tokyo; Yasutaka Ushijima, Fukuoka, both of Japan

[73] Assignee: NEC Corporation, Tokyo, Japan

[21] Appl. No.: 364,427

[22] Filed: Dec. 27, 1994

Related U.S. Application Data

[63] Continuation of Ser. No. 882,593, May 13, 1992, abandoned.

[30] Foreign Application Priority Data

May 15, 1991 [JP] Japan ................... 3-141074

[51] Int. Cl.$^6$ ................................. H03M 7/00
[52] U.S. Cl. ............................ 395/800; 395/708
[58] Field of Search ................. 395/800, 500, 395/708; 341/51

[56] References Cited

U.S. PATENT DOCUMENTS

| | | | |
|---|---|---|---|
| 4,994,998 | 2/1991 | Anezaki | 364/DIG. 2 |
| 5,210,535 | 5/1993 | Fujita | 341/51 |
| 5,263,137 | 11/1993 | Anezaki | 395/200 |

FOREIGN PATENT DOCUMENTS 299047  2/1991  Japan .

OTHER PUBLICATIONS

Ohara et al., "Ans.1 Tools for Semi–Automatic Implementation of Osi Application Layer Protocols", Proceedings of the Second International Symposium on Interoperable Information Systems, Intap 1988, pp. 63–70.

*Computer Networks and ISDN System 14* "An Architecture for an ASN.1 Encoder/Decoder", by Caneschi, et al. 1988, pp. 297–303.

*Message Handling Systems*, "Prospect: A Tool for Protocol Specification and Conformance Testing", by Plattner, et al. pp. 441–450.

*Proceedings of the Second International Symposium on Interoperable Information Systems, Intap, 1988*"Development and Evaluation of Apricot (Tools for Abstract Syntax Notation One)", Nakakawaji, et al., pp. 55–62.

*International Standard*, "Information processing systems–Open Systems Interconnection–Specification of Abstract Syntax Notation One (ASN.1)", ISO 8824, First Edition, 1987, pp. 1–50.

*International Standard*, "Information processing systems–Open Systems Interconnection–Specification of Basic Encoding Rules for Abstract Syntax Notation One (ASN.1)", ISO 8825, First Edition, 1987, pp. 1–16.

*Primary Examiner*—Alyssa H. Bowler
*Assistant Examiner*—John Harrity
*Attorney, Agent, or Firm*—Foley & Lardner

[57] ABSTRACT

The system for supporting input or reference of a data value or a structure value which is a component of a PDU (Protocol Data Unit). The abstract syntax of PDU is defined in accordance with ISO8824 (international standard ASN.1 (Abstract Syntax Notation One) specification) and the PDU is encoded/decoded conforming to ASN.1 basic encoding rules in ISO8825. The data value and the structure value are described in the form of substitute statement of the abstract syntax identifier.

4 Claims, 4 Drawing Sheets

FIG. 2(a)

```
PDU ::= CHOICE { a INTEGER, b SEQUENCE { d IA5STRING OPTIONAL, e [0] BIT STRING, f [1] IMPLICIT NULL

}, c OCTET STRING
}
```

FIG. 2(b)

```
b {d "ABC" , e '101'B , f NULL}
```

FIG. 4

| | ID | LNG | PTR | |
|---|---|---|---|---|
| VTL [0] | b | { | | |
| ⋮ | d | 3 | •→ | 41, 42, 43 |
| ⋮ | e | 3 | •→ | A0 |
| | f | NULL | | |
| [4] | | } | | |

FIG. 5(a)

b.d = "ABC"

b.e = '101'B b.f = NULL

FIG. 5(b)

VAL1 = b.d

VAL2 = b.e

VAL3 = b.f

SYSTEM FOR SUPPORTING A CONVERSION BETWEEN ABSTRACT SYNTAX AND TRANSFER SYNTAX

This application is a continuation of application Ser. No. 07/882,593, filed May 13, 1992, now abandoned.

BACKGROUND OF THE INVENTION

This invention relates to a system for supporting ASN.1 (Abstract Syntax Notation One) protocol encoding/decoding in OSI (Open Systems Interconnection) presentation/application protocol. The invention is utilized for input and reference of a value which is the component of a PDU (Protocol Data Unit) which is described in accordance with ISO8824 and is encoded/decoded on the basis of the ASN.1 encoding rules in ISO8825.

Encoding of a PDU requires inputting a data value which is a component of the PDU, while decoding of a PDU requires referring to a data structure value which is a component of the PDU. Input or reference of such values can be performed by using a program that provides the interface conversion between an user program and a table (VTL: Value Tree List) with values corresponding to a data structure of a machine processable abstract syntax. In order to make such an interface program, a programmer must understand a complex data structure of an abstract syntax and then hand-code the complicated interface program. Therefore, some data are likely to be lost because of possible mistakes by the programmer when the data structure is complex, and moreover, many steps are required for understanding of the data structure itself.

SUMMARY OF THE INVENTION

It is an object of the present invention to provide a system which solves the above problems and which is capable of easily inputting or referring to data structure values without being conscious of a complex data structure of the PDU.

According to the present invention, a system supports a conversion between an abstract syntax described in accordance with ISO8824 and a transfer syntax conforming to ASN.1 basic encoding rules based on ISO8825. The system includes: a first generating unit for generating a first table where an input abstract syntax is converted to a machine processable data structure; an input/reference unit for inputting or referring to data values or structure values corresponding to the data structure of the abstract syntax; a second generating unit for generating an input/reference program in accordance with the data structure of the abstract syntax on the basis of the input data values or the referred-to structure values, the input/reference program providing the interface conversion between a use program and a second table storing the data values in the format corresponding to the structure values; and an encoding/decoding unit for encoding the data values of the abstract syntax or decoding the transfer syntax on the basis of the first table and the input/reference program.

Preferably, the encoding/decoding unit is provided with a transmitter for sending the encoded transfer syntax and a receiver for receiving the transfer syntax to be decoded.

The encoding process is started when an abstract syntax described in accordance with ISO8824 is input to the first generating unit and the data value of the abstract syntax is given to the input/reference unit. The input abstract syntax is expanded into the first table (AST: ASN.1 Syntax Table) in the format of machine processable data structure. The data value of the input abstract syntax is input to the input/reference unit in the form of a statement (hereinafter referred to as input statements).

The input/reference program is generated based upon the input statements. Referring to the first table (AST), the input/reference program converts the data value, which is stored into the second table (VTL: Value Tree List). The second table (VTL) is constructed in the form of table corresponding to the structure value to store the data value. Using the first (AST) and the second (VTL) tables, the encoding/decoding unit encodes the data value into the corresponding transfer syntax conforming to encoding rules prescribed in ISO8825. The input/reference program informs the user program of the encoding process.

The decoding process is performed on the basis of a received transfer syntax and the first table (AST). Referring to the first table (AST), the encoding/decoding unit decodes the received transfer syntax into the data value, which is stored into the second table (VTL). The structure value of the input abstract syntax is input to the input/reference unit in the form of a statement (hereinafter referred to as reference statements). The input/reference program, referring to the first table (AST) and the reference statements (or the structure value), reads out the data value from the second table (VTL) and transfers it to the user program.

The input statements and the reference statements input by the input/reference unit are preferably described in the form of a substitute statement of an abstract syntax identifier.

Thus, inputting or referring to data values or structure values is easily achieved without being conscious of the complicated data structure, thereby energy reservation is achieved, and data loss due to possible errors by a programmer is avoided.

The above and other objects and advantages of the present invention will be understood from the following description of preferred embodiments of the present invention when taken in conjunction with the accompanying drawings.

BRIEF DESCRIPTION OF THE DRAWINGS

FIG. 2(a) illustrates an abstract syntax described in accordance with ISO8824 in the present embodiment;

FIG. 2(b) illustrates the description of values of ISO8824 in the embodiment.

FIG. 4 illustrates a table (VTL) which stores the data values in the format corresponding to the structure values.

FIG. 5(a) illustrates the input statements (data value) received by the input/reference unit in the embodiment.

FIG. 5(b) illustrates the reference statements (structure value) referred to by the input/reference program in the embodiment.

DETAILED DESCRIPTION

An embodiment of a protocol encoding/decoding support apparatus according to the present invention will be described hereinafter in detail with reference to the drawings.

Figure 1:
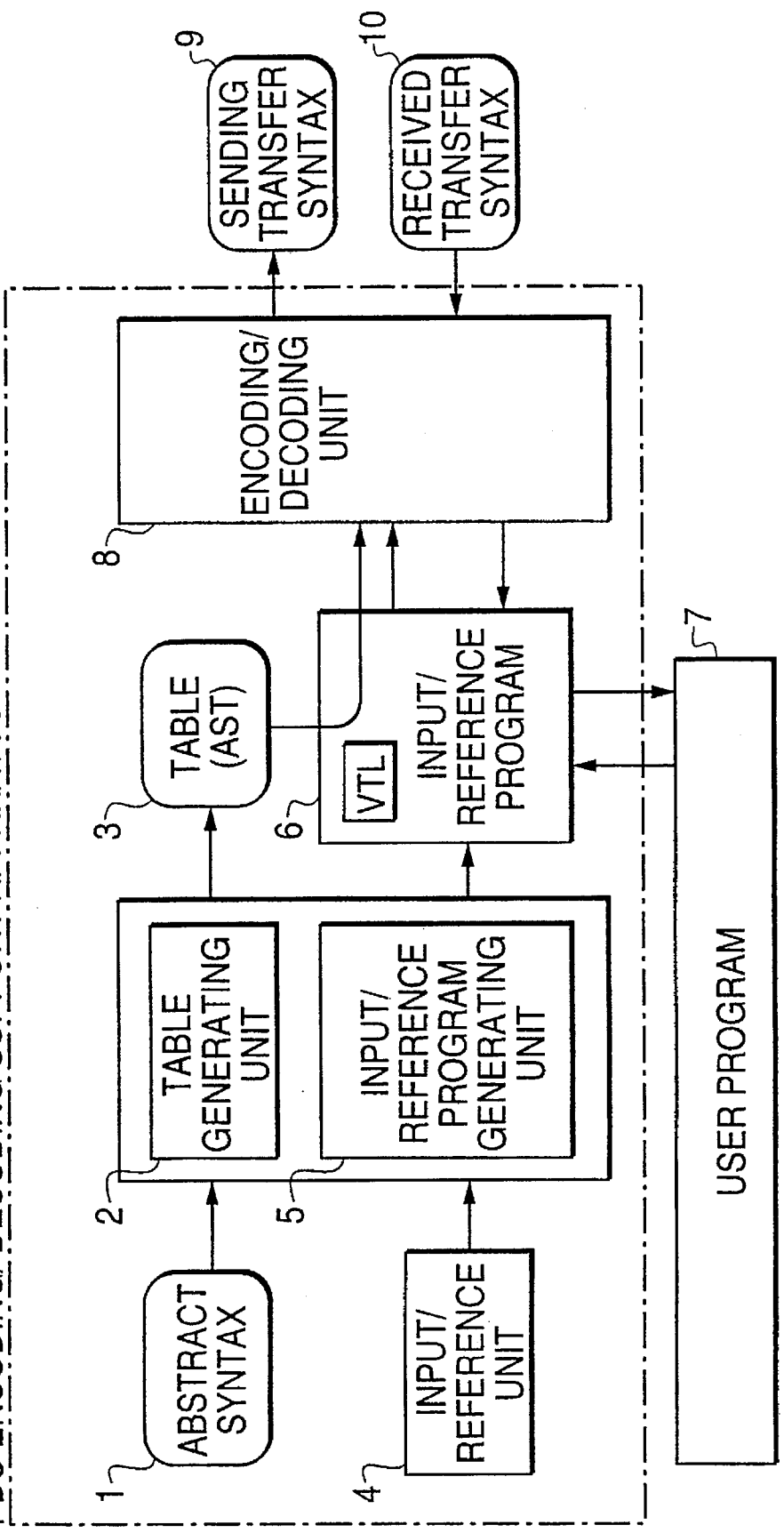
FIG. 1 is a block diagram of an embodiment of the present invention.

FIG. 1 is a block diagram of the embodiment of the present invention. The inventive support apparatus for supporting the conversion between an abstract syntax 1 described in accordance with ISO8824 (ASN.1 specification) and a transfer syntax 9 or 10 in accordance with ISO8825 (ASN.1 basic encoding rules), includes: a table generating unit 2 which generates a table (AST) 3 where the abstract syntax 1 is converted to a machine processable data structure; an input/reference unit 4 which inputs or refers to a data value or a structure value corresponding to the data structure of the abstract syntax 1; an input/reference program generating unit 5 which generates an input/reference program 6 which provides the interface conversion between an user program 7 and a table 1 (VTL) which stores the data value in the format corresponding to the structure value; and an encoding/decoding unit 8 which encodes the data value of the abstract syntax or decodes the received transfer syntax on the basis of the input/reference program 6 and the table (AST) 5. The encoding/decoding unit 8 is preferably provided with a transmitter unit for sending the encoded transfer syntax 9 and a receiver unit for receiving a transfer syntax 10 to be decoded.

Figure 3:
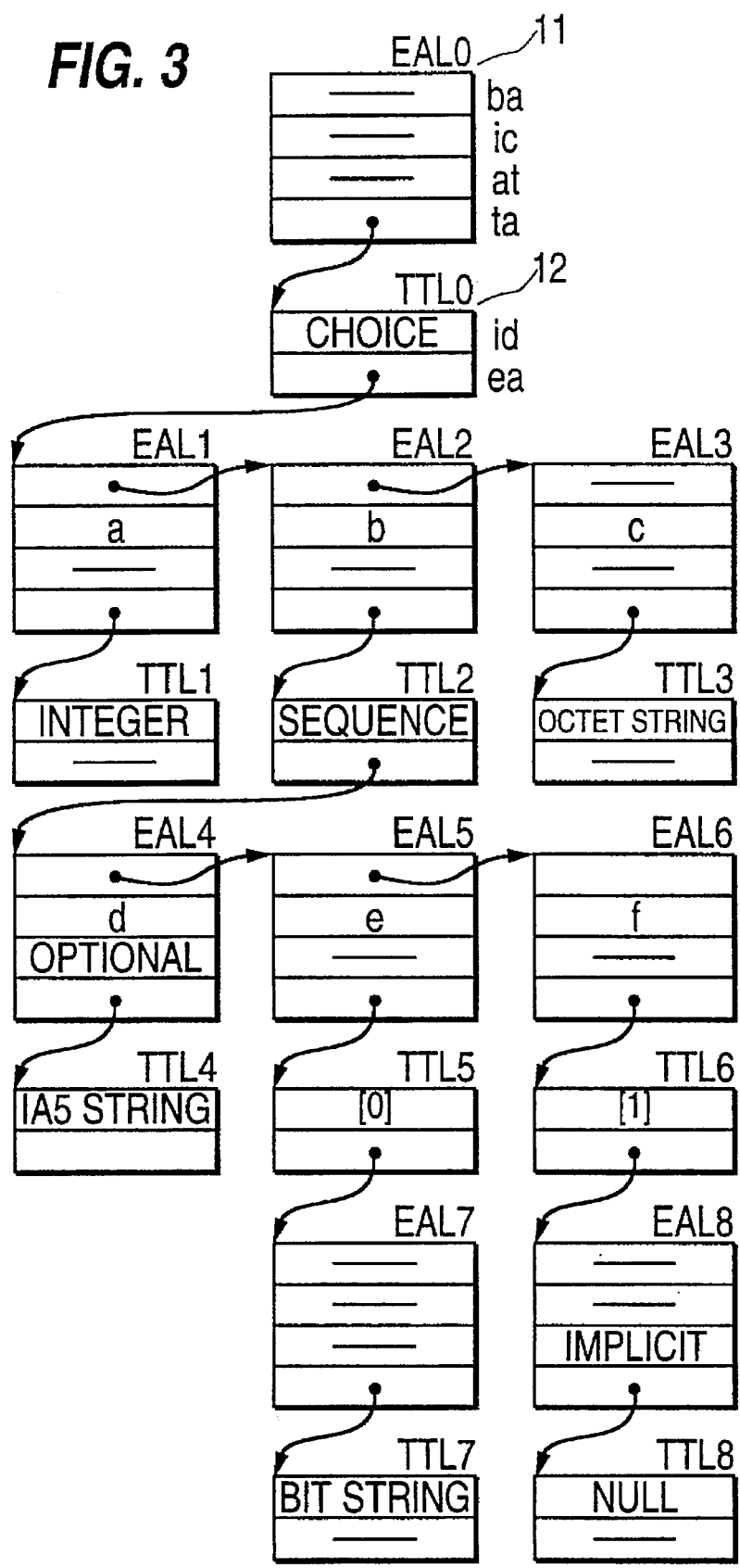
FIG. 3 illustrates a table 1 (AST) indicative of the data structure of the abstract syntax in the embodiment.

The operation of the embodiment shown in FIG. 1 will be described hereinafter. Receiving an abstract syntax 1 as shown in FIG. 2(a), the table generating unit 2 generates a table (AST) 3 shown in FIG. 3. In FIG. 5, EAL011 corresponds to an element of the type shown in FIG. 2(a); ba denotes a pointer to the next EAL; ic, an added identifier; at, attributes such as OPTIONAL or IMPLICIT; and ta, a pointer to a TTL of the corresponding type. TTL012 corresponds to an element of the type shown in FIG. 2(a); id, an identifier corresponding to the type; and ea, a pointer to EAL when there is an element.

Now, the encoding process of the data values of an abstract syntax (hereinafter referred to as encoding a PDU) will be described. Encoding of a PDU is started when the PDU is given a description of the data value as shown in FIG. 2(b) for the abstract syntax of FIG. 2(a). In the embodiment, input statements with the data value in FIG. 5(a) corresponding to FIGS. 2(a) and 2(b) are input from the input/reference unit 4 to the input/reference program generating unit 5. The input/reference program generating unit 5 generates the input/reference program 6 according to the data structure of FIG. 2(a). The program 6 performs the interface conversion between the table (VTL) shown in FIG. 4 and the user program 7 on the basis of the input statements input from the input/reference unit 4. The encoding/decoding unit 8 receives the table (AST) 3 produced by the table generating unit 2 and the input/reference program 6 produced by the input/reference program generating unit 5, encodes the data value of the abstract syntax 1 in accordance with the encoding rules prescribed in ISO8825 and outputs the sending transfer syntax 9.

The decoding process of a PDU will be described hereinafter. Assume that a transfer syntax 10 is received as a PDU where the data value shown in FIG. 2(b) are described in the abstract syntax shown in FIG. 2(a). The encoding/decoding unit 8, referring to the table (AST) 3 produced by the table generating unit 2, decodes the received transfer syntax 10 in accordance with the encoding rules in ISO8825, and stores the data value into the table (VTL) shown in FIG. 4. The input/reference program generating unit 5 inputs the structure value from the input/reference unit 4. The structure value is described in the form of reference statements as shown in FIG. 5(b). The input/reference program generating unit 5, in accordance with the data structure of FIG. 2(a), generates the input/reference program 6 which provides the interface conversion between the table (VTL) shown in FIG. 4 and the user program 7. The input/reference program 6 reads out the data value stored in the table (VTL) referring to the table (AST) 3, and sends the data value to the user program 7.

As described above, when a PDU is encoded or decoded, the data value or the structure value which is a component of the PDU is input by the input/reference unit 4 to the input/reference program generating unit 5, and moreover they are described in the form of 1 substitute statement of the abstract syntax identifier as shown in FIG. 5(a) and 5(b). This makes it easy to input or refer to such values without being conscious of a complicated data structure of the abstract syntax, thereby energy reservation is achieved, and loss of data due to possible errors is avoided.

It is to be understood that the above-described arrangements are simply illustrative of the invention. Other arrangements may be devised by those skilled in the art which will employ the principles of the invention and fall within the spirit and scope thereof.

What is claimed is:

1. A system for converting between an abstract syntax and a transfer syntax, comprising:

a table generating unit which receives an input abstract syntax, and which generates a first table for converting the abstract syntax to a machine processable data structure;

an input/reference unit providing a data value corresponding to the abstract syntax;

an input/reference program generating unit which receives the data value from the input/reference unit and generates an input/reference program containing the data value;

a user program connected to the input/reference program, the user program providing encoding and decoding requests to the input/reference program, wherein in response to the encoding request, the input/reference program stores in a second table an identifier which indicates correspondence between the abstract syntax in the first table and the data value provided by said input/reference unit, a data length of the data value, and the data value, and in response to a decoding request, the input/reference program sends the data value, the data length and the identifier to the user program from the second table; and an encoding/decoding unit connected to the input/reference program, wherein when the user program provides the encoding request to the input/reference program, the encoding/decoding unit receives the data structure from the first table and selects, based thereon, the corresponding data value, data length, and identifier from the second table and encodes a sending transfer syntax based on the corresponding data value, data length and identifier, and when the user program provides the decoding request to the input/reference program, the encoding/decoding unit receives a received transfer syntax, selects a data structure from the first table corresponding to the received transfer syntax in accordance with an identifier contained in the received transfer syntax, decodes the received transfer syntax in accordance with the corresponding data structure, and stores the data value, data length and identifier in the second table.

2. A system for converting between as abstract syntax and a transfer syntax as recited in claim 1, wherein the transfer syntax has an ASN.1 type data structure and the identifier identifies an ASN.1 type data structure.

3. A method of converting between an abstract syntax and a transfer syntax, comprising the steps of:

generating a first table containing a processable data structure by converting an input abstract syntax to the processable data structure;

inputting a data value corresponding to the abstract syntax;

generating an input/reference program containing the data value;

providing an encoding request from a user program;

storing in a second table, in response to the encoding request, an identifier which indicates correspondence between the abstract syntax in the first table and the data value generated by the input/reference program, a data length of the data value, and the data value; and encoding a sending transfer syntax based on the data structure from the first table and the corresponding data value, data length and identifier from the second table.

4. The method of claim 3, further comprising the steps of:

receiving a received transfer syntax in response to a decoding request from the user program;

selecting a data structure from the first table corresponding to the received transfer syntax in accordance with an ASN.1 type identifier contained in the received transfer syntax;

decoding the received transfer syntax in accordance with the corresponding data structure; and storing a corresponding data value, data length and identifier in the second table.

* * * * *